March 16, 1926.

C. A. WULF 1,576,889

AUTOMATIC FUEL CUT-OUT

Filed July 2, 1921

Inventor
Charles A. Wulf,
By Hood & Schley
Attorneys

Patented Mar. 16, 1926.

1,576,889

UNITED STATES PATENT OFFICE.

CHARLES A. WULF, OF INDIANAPOLIS, INDIANA.

AUTOMATIC FUEL CUT-OUT.

Application filed July 2, 1921. Serial No. 482,125.

*To all whom it may concern:*

Be it known that I, CHARLES A. WULF, a citizen of the United States, residing at Indianapolis, in the county of Marion and State of Indiana, have invented a new and useful Automatic Fuel Cut-Out, of which the following is a specification.

In the operation of that type of internal combustion engine which is lubricated by lubricant delivered under pressure to the various desired points, it sometimes happens either that the lubricant is depleted to such an extent that it can not be properly delivered to the desired points, or the ducts become clogged so as to prevent proper flow, or the pump fails for some reason or another to deliver the lubricant at proper pressure. Under such circumstances, much damage can result from a continued operation of the engine, especially at high speeds.

The object of my present invention is to automatically prevent the delivery of fuel to the engine whenever the delivery pressure of the lubricant falls below a specified desirable minimum.

A further object of my invention, in addition to providing means by which the above stated result may be obtained, is to provide means by which the user, having been warned of the defective condition of his lubricating system, by a cutting off of the supply of fuel, may readily adjust the apparatus in such way as to permit a further delivery of fuel so that he may proceed for a desired distance at low speeds.

Figure 1:
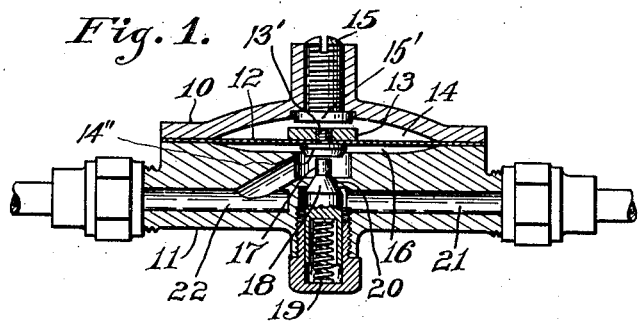
Figure 2:
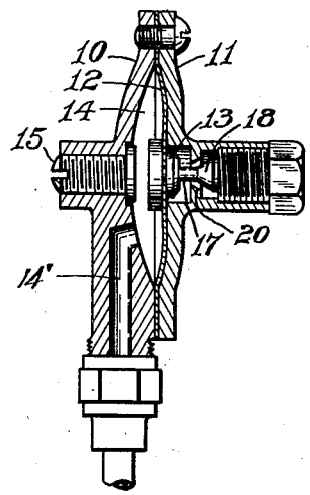
Figure 3:
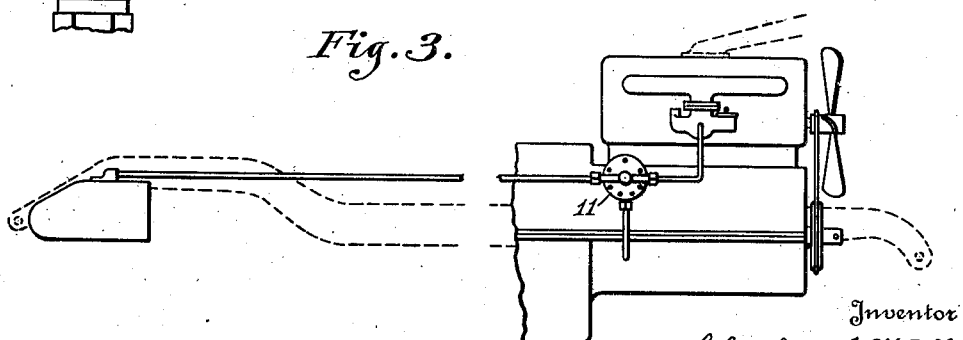

The accompanying drawings illustrate an apparatus embodying my invention. Fig. 1 is a transverse section longitudinally of the fuel line; Fig. 2 is a transverse section longitudinally of the oil duct; Fig. 3 is a diagram showing my improved automatic cut-out in conjunction with an internal combustion engine having a pressure oiling system, and Fig. 4 an elevation of a modification.

In the drawings 10 and 11 indicate a pair of mating disks between which is secured a thin, preferably metal, diaphragm 12 carrying a central button 13. The button 13 is secured on the diaphragm 12 by a rivet 13' the head 14" of which is on the opposite side of the disk. The parts being riveted together in this manner, a wearing surface is provided for the opposite sides of the diaphragm and at the same time, due to the tightness of the rivet, danger of the gasoline leaking through to the oil chamber is prevented. Part 10 is provided with a shallow cavity 14 into which leads the oil duct 14', to be connected to the delivery side of the oil pump. Threaded through the bottom of cavity 14 is a plug 15, the purpose of which will appear.

Disk 11 is provided with a very shallow cavity 16 into which projects the stem 17 of a valve 18 normally held to its seat by spring 19. The valve 18 is seated, by spring 19, in a seat 20 which lies between the fuel supply duct 21 and the fuel delivery duct 22, said seat being preferably so formed that there may be sufficient leakage past the valve 18 to permit a slow filling of the carburetor.

That portion of the button 13 which is within cavity 14 is somewhat larger in diameter than the portion within cavity 16, so that when the diaphragm 12 is flexed, by oil pressure within cavity 14, to a sufficient extent to open valve 18, the diaphragm 12 will be seated upon the bottom of the cavity 16, and thus prevent abnormal distortion of the diaphragm under greater pressures of oil in chamber 14. Actual dimensions are not illustrated in the drawing. I have found however, that in actual construction, with the parts substantially of the size illustrated in the drawing, it is only necessary to make the cavity 16 about thirty-two thousandths of an inch in depth, and when the diaphragm is made of metal, the diaphragm is two thousandths of an inch in thickness. This gives sufficient movement on the part of the diaphragm to perform its function and at the same time provides a diaphragm which is extremely flexible and will respond to very slight pressures.

In practice in assembling, I have found it advantageous to use a perfectly flat diaphragm which is clamped between the two parts 10 and 11. In assembly, the securing screws for holding these two parts together, at first are only turned up sufficiently tight to make a metal to metal meet between edges of the diaphragm and the disks 10 and 11. The screw 15 is then turned up until the diaphragm is fully seated upon the bottom of the cavity 16 after which the screws holding the two disks 10 and 11 are set tight so that the diaphragm 12 will be held dished. This manipulation of the parts in assembly dishes the diaphragm without buckling and without straining the metal so that the diaphragm will be perfectly free to flex back and forth without having imparted thereto, a distorting strain.

In operation, the slight permitted leakage past valve 18 insures an initial supply of fuel in the carburetor although valve 18 is upon its seat. This supply, however, is not sufficient to permit the engine to run for any considerable period. As soon as the engine is started, if its lubricating system is in normal condition, the oil pressure within chamber 14 will become sufficient to deflect diaphragm 12 so as to drive button 13 into engagement with valve 18 and open said valve, thereby permitting the free flow of fuel through passages 21 and 22.

If, for any reason, the pressure of lubricant decreases below a desired minimum, diaphragm 12 will immediately move to normal position thus permitting valve 18 to close, whereupon the engine will stop for lack of fuel. This operation gives notice to the operator that his oiling system is in such condition that the engine should not be run for any great period or at high speeds but, in order that the car may be brought to the nearest garage for an oil supply, the operator may screw plug 15 into chamber 14 to a sufficient extent to engage button 13 and move it into engagement with valve 18 so as to open said valve, whereupon the car may be driven to the desired destination, the operator being advised that the oiling system is not working properly and, therefore, driving the car carefully so as not to cause injury to the engine.

The screw plug 15 is provided with a head 15' which seats within the cavity 14 so that when the screw 15 is backed out to release the diaphragm the head 15 will seat against the wall of the disk 10 and seal the screw-threaded opening to prevent any seepage of oil past the plug 15. It will further be noted that the end 17 of the valve 18 is not directly connected to the diaphragm but merely rests against the rivet head 14'' so that there will be no danger of a twisting or straining action taking place to loosen the parts and permit a seepage of gasoline into the oil chamber 14.

Figure 4:
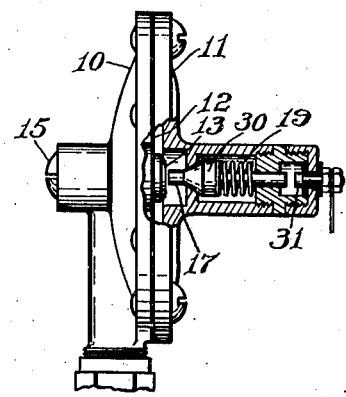

It will now be understood that the primary purpose of the invention is to provide automatically operating means which, upon the failure of the lubricating system to properly function with relation to the engine, will serve to cause a stoppage of the engine. It will, therefore, be understood that this stoppage can be accomplished in other ways than in cutting off the fuel supply, as for instance, as indicated in Fig. 4, I may provide, instead of the fuel controlling valve 18, a contact member 30 which will be part of the ignition circuit, which contact member will be normally out of contact with the companion terminal 31, but will be brought into contact with said terminal 31 whenever the diaphragm is flexed by the oil supply.

I claim as my invention:—

1. As an article of manufacture, a lubricant controlled fuel valve for internal combustion engines comprising a pair of mating chamber forming members having concave recesses on the meeting faces thereof to form the chamber, one of said members having a fuel passage extending therethrough provided with a valve seat, a valve socket extending transversely of said fuel passage, a valve mounted in said socket and a coil spring for maintaining said valve normally seated, a flexible diaphragm clamped between the meeting faces of said member, wear plates secured on the opposite faces of said diaphragm, the fuel passage member being provided with a recess merging into the concave recess on the face of the member and into which a stem of the valve projects, one of the wearing plates on said diaphragm being adapted to project into said recess and engage said stem when the diaphragm is flexed and the other wear plate being of greater diameter than said recess, the chamber on the opposite side of said diaphragm having a port extending thereinto, and a set screw arranged at right angles to the diaphragm and adapted to be moved into engagement with the wear plate on the diaphragm, said set screw being provided with a head normally seating in a socket in the face of the chamber member and said set screw and valve stem being disconnected from the diaphragm.

2. As an article of manufacture, a lubricant controlled fuel valve for internal combustion engines comprising a valve supporting base transversely bored to form a passage therethrough, a valve seat formed in said passage, an opening in said base at right angles to said passage to receive a valve arranged to seat on said valve seat, a nut having a threaded stem threading into said opening for closing the same and a coil spring interposed between said nut and the valve for maintaining the same normally seated, said base on its face having a concave recess merging at its center into an annular chamber, a cover member having a concave recess on its face co-operating with said recess on the base to form a chamber, a diaphragm secured in position between the meeting faces of said base and cover member and provided on its opposite faces with wear plates, one of said wear plates being adapted when the diaphragm is flexed, to project into the annular recess in said base and to engage the stem of the valve and the other wear plate being of greater diameter than said recess, a set screw extending through said cover member and having a head thereon larger in diameter than the size of the threaded opening for said screw and arranged to normally seat against the inner face of the cover member to seal said threaded opening, said set screw being arranged when advanced to engage a wear plate of the diaphragm to flex the diaphragm in a direction to open the valve, and said cover member being provided with an inlet port.

In witness whereof I, CHARLES A. WULF, have hereunto set my hand at Indianapolis, Indiana, this 29th day of June, A. D. one thousand nine hundred and twenty-one.

CHARLES A. WULF.